United States Patent

Morsy et al.

[11] Patent Number: 6,066,095
[45] Date of Patent: May 23, 2000

[54] ULTRASOUND METHODS, SYSTEMS, AND COMPUTER PROGRAM PRODUCTS FOR DETERMINING MOVEMENT OF BIOLOGICAL TISSUES

[75] Inventors: Ahmed A. Morsy, Durham; Olaf T. von Ramm, Efland, both of N.C.

[73] Assignee: Duke University, Durham, N.C.

[21] Appl. No.: 09/078,299

[22] Filed: May 13, 1998

[51] Int. Cl.[7] .................................................. A61B 8/00
[52] U.S. Cl. ............................................................ 600/438
[58] Field of Search ................................... 600/443, 447, 600/455, 454, 453, 456

[56] References Cited

U.S. PATENT DOCUMENTS

| | | | |
|---|---|---|---|
| 4,217,909 | 8/1980 | Papadofrangakis et al. | 128/663 |
| 4,770,184 | 9/1988 | Green, Jr. et al. | 128/661.08 |
| 4,928,698 | 5/1990 | Bonnefous | 128/661.09 |
| 5,042,491 | 8/1991 | Amemiya | 128/661.09 |
| 5,090,412 | 2/1992 | Shimazaki | 128/660.07 |
| 5,093,662 | 3/1992 | Weber | 342/26 |
| 5,099,848 | 3/1992 | Parker et al. | 128/661.07 |
| 5,109,857 | 5/1992 | Roundhill et al. | 600/455 |
| 5,111,823 | 5/1992 | Cohen | 128/660.07 |
| 5,289,820 | 3/1994 | Beach et al. | 128/661.07 |
| 5,309,914 | 5/1994 | Iinuma | 128/660.07 |
| 5,383,462 | 1/1995 | Hall | 128/661.08 |
| 5,394,155 | 2/1995 | Rubin et al. | 342/192 |
| 5,409,007 | 4/1995 | Saunders et al. | 128/661.01 |
| 5,409,010 | 4/1995 | Beach et al. | 128/661.09 |
| 5,411,028 | 5/1995 | Bonnefous | 128/661.08 |
| 5,429,137 | 7/1995 | Phelps et al. | 128/661.09 |
| 5,431,169 | 7/1995 | Gondo | 128/660.07 |
| 5,454,372 | 10/1995 | Banjanin et al. | 600/455 |
| 5,465,721 | 11/1995 | Kishimoto et al. | 128/660.07 |
| 5,474,070 | 12/1995 | Ophir et al. | 128/660.01 |
| 5,497,777 | 3/1996 | Abdel-Malex | 600/443 |
| 5,546,807 | 8/1996 | Oxaal et al. | 73/606 |
| 5,582,173 | 12/1996 | Li | 128/660.07 |

OTHER PUBLICATIONS

Trahey, et al., Angle Independent Ultrasonic Detection of Blood Flow, *IEEE Transactions of Biomedical Engineering*, vol. BME–34, No. 12 (Dec. 1987).

Trahey, et al., Angle independent ultrasonic blood flow detection by frame–to–frame correlation of B–mode images, *Ultrasonics* 1988, vol. 26 (Sep. 1988).

*Primary Examiner*—Marvin M. Lateef
*Assistant Examiner*—Maulin Patel
*Attorney, Agent, or Firm*—Myers Bigel Sibley & Sajovec

[57] ABSTRACT

A first set of ultrasound data values is obtained that correspond to the position of a biological tissue at a first time. A second set of ultrasound data values is obtained corresponding to positions of the biological tissue at a second time. A feature pattern is located in the first set of ultrasound data values so as to provide a reference feature pattern. A search region is determined in the second set of ultrasound data values that corresponds to the located reference feature pattern in the first set of ultrasound data values. A feature pattern is located in the search region of the second set of ultrasound data values so as to provide a candidate feature pattern corresponding to the reference feature pattern. A correlation is determined between the reference feature pattern in the first set of ultrasound data values and the candidate feature pattern in the search region in the second set of ultrasound data values. A candidate feature pattern is selected in the search region in the second set of ultrasound data values based on the correlation. The movement of the biological tissue is determined based on the reference feature pattern and the selected candidate feature pattern.

51 Claims, 6 Drawing Sheets

ULTRASOUND METHODS, SYSTEMS, AND COMPUTER PROGRAM PRODUCTS FOR DETERMINING MOVEMENT OF BIOLOGICAL TISSUES

This invention was made with Government support under grant number CDR 8622201 from the National Science Foundation and under grant number HL58104-01 from The National Institute of Health. The Government has certain rights to this invention.

FIELD OF THE INVENTION

The present invention relates to the field of imaging in general and to ultrasound imaging in particular.

BACKGROUND OF THE INVENTION

Medical ultrasound has gained increased popularity during the past two decades as a diagnostic tool. A number of techniques for tracking biological tissue using ultrasonic energy have been investigated, and some of these techniques are now considered standard clinical practice. These techniques may use the statistical temporal and spatial properties of the returned echo signal from the biological tissue. The returned signal can be analyzed either in the frequency or the time domain to determine motion information.

Frequency domain techniques, such as Doppler ultrasound, have been used clinically for some time. Frequency domain techniques may, however, suffer from fundamental performance limitations in certain clinical situations. The inability to detect non-axial movement, aliasing, and the inherent trade-off between spatial resolution and velocity amplitude resolution are a few examples of performance limitations associated with frequency domain techniques. For example, Doppler ultrasound estimates the velocity of biological tissue by measuring the shift in frequency between two ultrasonic scans reflected from the biological tissue. Doppler may not estimate the biological tissue velocity accurately, however, when the movement has a component in a direction other than along the ultrasonic energy's (axial) path of travel. Such a component of movement may not be detected by the Doppler technique because the movement (or a portion thereof) does not produce a frequency shift in the second ultrasound scan with respect to the first ultrasound scan. For example, if blood flow is in a direction that is normal to the path of ultrasonic energy, Doppler may not detect the movement.

Time domain techniques, such as correlation searching, may be based on tracking windowed speckle patterns from one ultrasonic acquisition to a later ultrasound acquisition. For example, a blind correlation search may involve obtaining two successive ultrasound scans of blood flow and analyzing the second scan for correlation with the first scan. The computing power used in a blind correlation search, however, may be significant, thereby possibly limiting the use of blind correlation search to off-line processing or to systems that have expensive dedicated processors, especially when applied to three-dimensional data. Correlation searching may, therefore, not be suitable for a real-time implementation. Moreover, a large kernel size may be needed to provide a more accurate correlation, however, the large kernel size may also reduce the spatial resolution of the velocity estimation.

Feature tracking may involve comparing the peak intensity values in a first ultrasound scan of tissue to the peak intensity values in a subsequent ultrasound scan corresponding to the same tissue. For example, U.S. Pat. No. 5,109,857 to Roundhill and von Ramm discloses peak tracking wherein a B-mode ultrasound scanner is used to obtain first and second ultrasound scans. The displacement of a particular peak in the first ultrasound scan is determined to be equal to the distance to the closest adjacent peak in the second ultrasound scan. This presumes a match between the two peaks, which may impose a limit on the magnitude of motion that can be tracked between successive scans.

Speckle noise and signal to noise ratio may affect the performance in tracking discrete features, such as peaks. In particular, speckle noise or a low signal to noise ratio may cause the peak intensity values to change over time. In view of the above discussion, there is a continued need for improved methods and systems for estimating blood flow velocity and tissue motion.

SUMMARY OF THE INVENTION

In view of the above, it is an object of the present invention to provide improved measurement of the movement of biological tissue.

It is another object of the present invention to provide improved efficiency in the measurement of blood flow velocity.

These and other objects are provided by methods of determining the movement of biological tissue using ultrasound data values. The method includes obtaining a first and a second set of ultrasound data values corresponding to positions of the biological tissue and locating a reference feature pattern in the first set of ultrasound data values. A search region is determined in the second set of ultrasound data values that corresponds to the reference feature pattern in the first set of ultrasound data values. Candidate feature patterns are located in the search region in the second set of ultrasound data values and a correlation is determined between the reference feature pattern in the first set of ultrasound data values and the candidate feature patterns in the search region in the second set of ultrasound data values. A candidate feature pattern is selected based on the correlation to the reference feature pattern. The movement of the biological tissue is determined based on the reference feature pattern in the first set of ultrasound data values and the selected candidate feature pattern in the search region.

In particular, the reference feature pattern includes a reference feature pattern locator that indicates the position of the reference feature pattern in the first set of ultrasound data values and a reference feature pattern matcher that includes ultrasound data values associated with the reference feature pattern locator. For example, the reference feature pattern matcher can be a kernel that includes ultrasound data values corresponding to positions in the first set of ultrasound data values surrounding the reference feature pattern locator.

The candidate feature pattern includes a candidate feature pattern locator that indicates the position of the candidate feature pattern in the second set of ultrasound data values and a candidate feature pattern matcher that includes ultrasound data values associated with the candidate feature pattern locator. The candidate feature pattern matcher can be a kernel that includes ultrasound data values corresponding to positions in the second set of ultrasound data values surrounding the candidate feature pattern locator.

The correlation is performed by generating a correlation factor that indicates the similarity between the reference feature pattern and the candidate feature pattern. The correlation factor can be generated by determining a normalized correlation coefficient between the reference feature pattern matcher with the candidate feature pattern matcher.

The present invention may provide improved measurement of the movement of biological tissue by determining a feature pattern matcher to determine the correlation between the reference feature pattern and the candidate feature patterns. The feature pattern matcher may provide greater uniqueness for the reference feature patterns and the candidate feature patterns so that the correlation provides a more accurate indication of the similarity between the reference feature patterns and the candidate feature patterns and thereby, provide a more accurate indication of the movement of the biological tissue. In contrast, the prior art may rely on the peak intensity of the ultrasound data values to detect features. Peak intensity may, however, vary over time and thereby cause the peak intensity value of a feature to change. Alternately, two or more features may have identical peak intensity values in the second ultrasound scan. Consequently, the peak intensity may not offer enough uniqueness to identify the feature from the first scan in the second scan, which may affect the accuracy of the estimated movement of the feature. In contrast, the feature pattern matcher of the present invention includes a group of ultrasound data values associated with the feature pattern (reference and candidate). The feature pattern matcher, therefore, provides an increased uniqueness identifier that allows more accurate tracking of feature patterns.

The present invention may provide improved computational efficiency by correlating candidate feature patterns that are detected in the search region, thereby reducing the number of candidate feature patterns to be correlated with the reference feature pattern. For example, the search region is determined as an estimation of the movement of the reference feature pattern during the interval between the first and second ultrasound scans. Candidate feature patterns are detected in the search region and correlated with the reference feature pattern, thereby eliminating correlation computations for feature patterns located outside the search region. Thus, the present invention may reduce the number of correlation computations to track the reference feature pattern, which may allow a reduction in computation power and may provide a higher speed determination of motion. In contrast, systems in the prior art may calculate the correlation between each ultrasound data value in the second scan and the reference feature pattern, thereby increasing the number of computations to track features. As will be appreciated by those of skill in the art, the present invention may be embodied as methods, systems, or computer program products.

DETAILED DESCRIPTION OF THE INVENTION

The present invention will now be described more fully hereinafter with reference to the accompanying drawings, in which a preferred embodiment of the invention is shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

As will be appreciated by one of skill in the art, the present invention may be embodied as a method, data processing system or computer program product. Accordingly, the present invention may take the form of an entirely hardware embodiment, an entirely software embodiment or an embodiment combining software and hardware aspects. Furthermore, the present invention may take the form of a computer program product on a computer-readable storage medium having computer-readable program code means embodied in the medium. Any suitable computer readable medium may be utilized including hard disks, CD-ROMs, optical storage devices, or magnetic storage devices.

The present invention is also described herein using a flowchart illustration. It will be understood that each block of the flowchart illustration, and combinations of blocks in the flowchart illustration, can be implemented by computer program instructions. These computer program instructions may be loaded onto a computer or other programmable apparatus to produce a machine, such that the instructions which execute on the computer or other programmable apparatus create means for implementing the functions specified in the flowchart block or blocks.

These computer program instructions may also be stored in a computer-readable memory that can direct a computer or other programmable apparatus to function in a particular manner, such that the instructions stored in the computer-readable memory produce an article of manufacture including instruction means which implement the function specified in the flowchart block or blocks. The computer program instructions may also be loaded onto a computer or other programmable apparatus to cause a series of operational steps to be performed on the computer or other programmable apparatus to produce a computer implemented process such that the instructions which execute on the computer or other programmable apparatus provide steps for implementing the functions specified in the flowchart block or blocks.

Accordingly, blocks of the flowchart illustration support combinations of means for performing the specified functions and combinations of steps for performing the specified functions. It will also be understood that each block of the flowchart illustration, and combinations of blocks in the flowchart illustration, can be implemented by special purpose hardware-based computer systems which perform the specified functions or steps, or combinations of special purpose hardware and computer instructions.

Ultrasound images typically include a granular structure or mottle called speckle. Ultrasound speckle results from the coherent accumulation of random scattering of ultrasonic energy from the biological tissue being observed. The present invention analyzes the displacement of the speckle or feature patterns on an ultrasound scanner display over a period of time to estimate the movement and velocity of biological tissue. The speckle patterns are processed as unique data patterns that move over time and may, therefore, be tracked as feature patterns in the ultrasound data values. For example, the displacement of the feature patterns can be measured to estimate blood flow velocity. It will be understood that the term biological tissue, as used herein, includes blood and tissue found in organs and blood vessels in the body.

Figure 1:
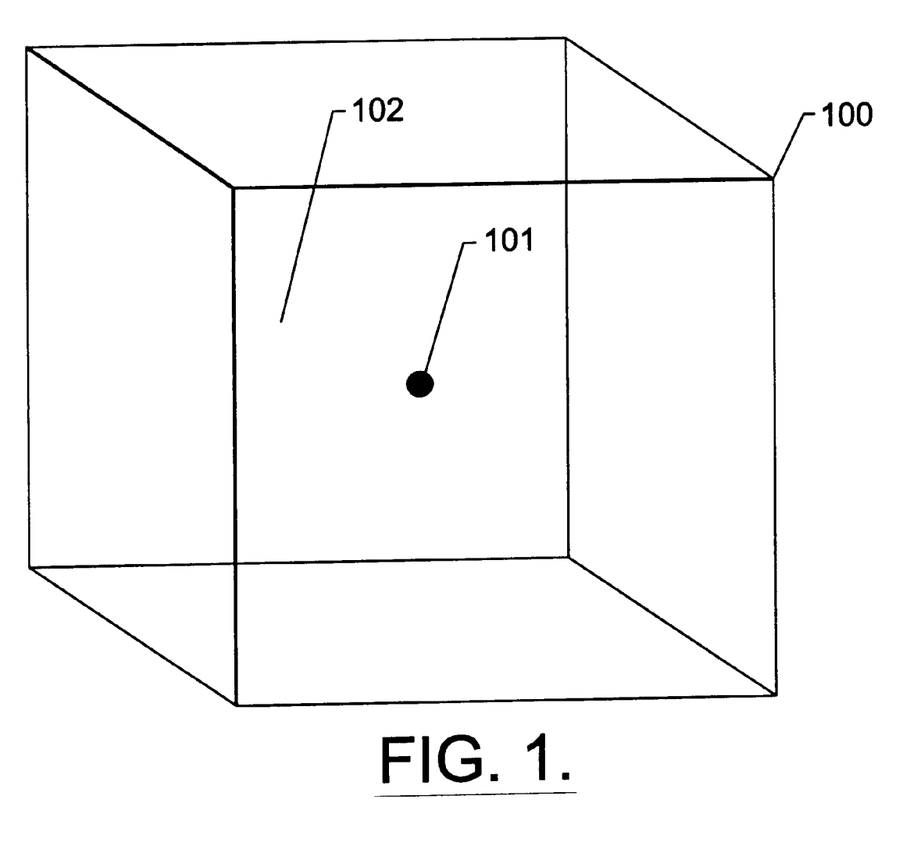
FIG. 1 is an illustration of a feature pattern according to the present invention.

FIG. 1 illustrates a feature pattern according to the present invention. The feature pattern 100 includes a feature pattern locator 101 that indicates the location of the feature pattern 100. For example, the feature pattern locator 101 can be a point in the ultrasound data values that corresponds to a local maximum of the ultrasound data. The feature pattern 100 also includes a feature pattern matcher 102, associated with the feature pattern locator 101, that provides a uniqueness identifier for the feature pattern 100. For example, the feature pattern matcher 102 can be a 10×10×10 group of ultrasound data values that surround the feature pattern locator 101.

The displacement of the biological tissue can be measured by locating a feature pattern 100 in a first ultrasound scan and locating the same feature pattern in a second ultrasound scan obtained after a time interval. The present invention, therefore, locates a feature pattern (a reference feature pattern) in the first ultrasound scan, locates feature patterns in the second ultrasound scan (candidate feature patterns), and correlates the reference feature pattern with the candidate feature patterns to determine which candidate feature pattern matches the reference feature pattern. Therefore, each candidate feature pattern is a potential match with the reference feature pattern.

When a match is found between the reference feature pattern and a candidate feature pattern, the matched candidate feature pattern is determined to be the position of the reference feature pattern at the time of the second scan. The movement of the biological tissue is determined by locating reference feature patterns throughout the first ultrasound scan and determining a matching candidate feature pattern for each reference feature pattern in the first ultrasound scan.

The candidate feature patterns are detected in a search region that represents an estimated displacement of the reference feature pattern in the time between the first and second ultrasound scan. The candidate feature patterns are located in the search region, thereby allowing a reduction in computation time by reducing the number of candidate feature patterns correlated with the reference feature pattern in the first set ultrasound data values.

The correlation is determined using the feature pattern matcher (such as a kernel) for the feature patterns. The feature pattern matcher may allow the same feature pattern to be located in a second ultrasound scan. The correlation may, thereby, provide better performance than comparing the intensity of particular ultrasound data values. For example, the kernel typically includes a number of ultrasound data values corresponding to positions located proximate to the feature pattern locator. The increased amount of data for each feature pattern may improve the likelihood of identifying the correct candidate feature pattern in the second ultrasound scan.

Figure 2:
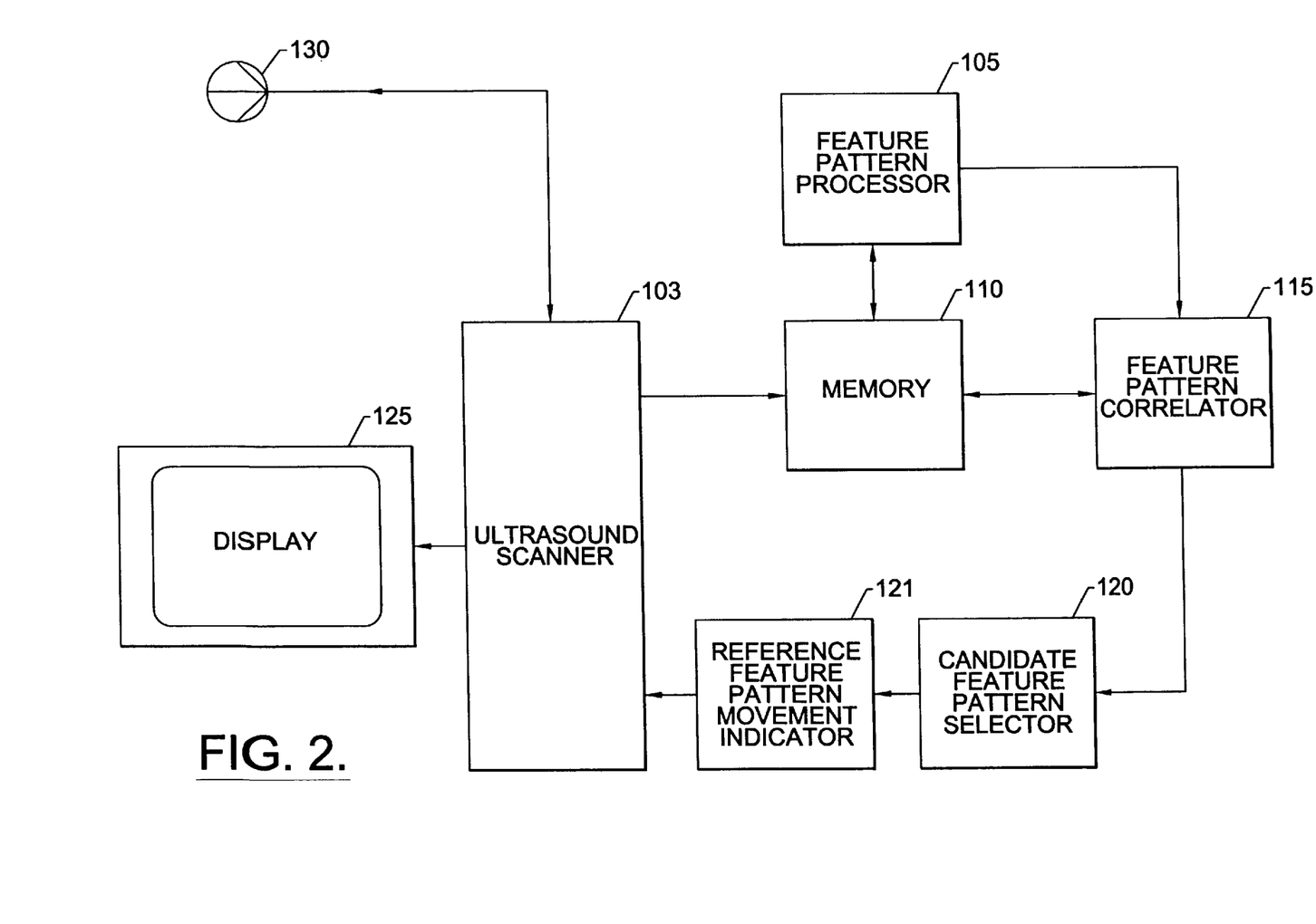
FIG. 2 a block diagram of an ultrasound system that measures the movement of biological tissue according to the present invention.

FIG. 2 is a block diagram of an ultrasound system for measuring biological tissue movement according to the present invention. The transducer 130 is preferably an ultrasonic probe that is contacted with body of a patient or a catheter that is inserted into a patient. The transducer 130 receives electrical pulses from the ultrasound scanner 103 and translates the electrical pulses to ultrasonic energy. The ultrasonic energy is emitted from the transducer 130 into the patient's body wherein the ultrasonic energy is incident upon, and is reflected from, biological tissue in the patient's body. The transducer 130 also detects the reflected ultrasonic energy and converts the received reflected ultrasonic energy to an electrical pulse or pulses that are transmitted to the ultrasound scanner 103. The transducer 130 can be an ultrasonic transducer that produces one, two or three dimensional ultrasound scans.

The ultrasound scanner 103 transmits electrical pulses to the transducer 130 and receives electrical pulses from the transducer 130 that correspond to the ultrasonic energy reflected from biological tissue in the patient's body. The ultrasound scanner 103, converts the electrical pulses received from the transducer 130 into ultrasound data values, and transmits the ultrasound data values to the display 125. The ultrasound scanner 103, thereby obtains a first and a second set of ultrasound data values associated with the biological tissue. The ultrasound scanner 103 can be a High Speed Volumetric Ultrasound Imaging System as disclosed in U.S. Pat. No. 5,546,807 to Oxaal et al. The display 125 may be a cathode ray tube, liquid crystal display, or other display device with adequate dynamic range for the display of ultrasonic image.

The ultrasound scanner 103 transmits the first and second set of ultrasound data values to the memory 110 so that the feature pattern detector 105 and the feature pattern correlator 115 may access the first and second sets of ultrasound data values. The ultrasound scanner 103 receives the determined reference feature pattern movement from the reference feature pattern movement indicator 121. In one embodiment, the ultrasound data values are obtained from a storage medium (such as an optical disk) wherein the ultrasound data values were obtained via a real time scan at a previous time and stored for off-line analysis.

A feature pattern processor 105 locates feature patterns in the first and second sets of ultrasound data values. For each feature pattern located in the first set of ultrasound data values (reference feature patterns), the feature pattern processor 105 indicates the position of the reference feature pattern in the first set of ultrasound data values so as to provide a reference feature pattern locator. The feature pattern processor 105 also determines a feature pattern matcher that includes ultrasound data values associated with the feature pattern locator so as to provide a reference feature pattern matcher. The reference feature pattern locator is a point in the first set of ultrasound data values that indicates the position of the located reference feature pattern. For example, in three dimensional ultrasound data values, the position of the reference feature pattern can be an (x,y,z) coordinate.

The feature pattern matcher can be a kernel that includes ultrasound data values associated with the feature pattern locator in the first set of ultrasound data values. For example, in three dimensional ultrasound data values, the feature pattern matcher can be a group of (x,y,z) coordinates corresponding to the points in the ultrasound data values surrounding the reference feature pattern locator. The reference feature pattern locator and reference feature pattern matcher corresponding to the reference feature pattern are transmitted to the feature pattern correlator 115 for use in generating a correlation factor. The feature pattern processor 105 stores the reference feature pattern in the memory 110. Alternately, the feature pattern locator 105 can store the locations in the memory 110 that contain the reference feature pattern.

The feature pattern processor 105 also locates feature patterns in the second set of ultrasound data values (candidate feature patterns). The candidate feature patterns in the second set of ultrasound data values represent potential matches corresponding to the reference feature pattern in the first set of ultrasound data values. The displacement between the matching candidate feature pattern and the reference feature pattern represents the movement of the biological tissue.

For each candidate feature pattern located, the feature pattern processor 105 indicates the position of the candidate feature pattern in the second set of ultrasound data values so as to provide a candidate feature pattern locator, and determines a feature pattern matcher that includes ultrasound data value associated with the feature pattern locator so as to provide a candidate feature pattern matcher. The candidate feature pattern locator is a point in the second set of ultrasound data values that indicates the position of the located candidate feature pattern. For example, in three dimensional ultrasound data values, the position of the candidate feature pattern can be an (x,y,z) coordinate.

The feature pattern matcher is a uniqueness indicator associated with the feature pattern locator. The feature pattern matcher is used to determine which of the located candidate feature patterns represents the located reference feature pattern. In one embodiment, the feature pattern matcher is a kernel that includes ultrasound data values associated with the feature pattern locator in the first set of ultrasound data values. For example, for three dimensional ultrasound data values, the feature pattern matcher can be a group of ultrasound data values surrounding the candidate feature pattern locator. The candidate feature pattern locator and candidate feature pattern matcher corresponding to the candidate feature pattern are transmitted to the feature pattern correlator 115 for use in generating a correlation factor. The feature pattern processor 105 stores the candidate feature pattern in the memory 110. Alternately, the feature pattern processor 105 can store the locations in the memory 110 that contain the candidate feature pattern.

The feature pattern processor 105 also determines a search region in the second set of ultrasound data values based on a search region marker. The feature pattern processor 105 selects a search region marker in the second set of ultrasound data values that corresponds to the reference feature pattern locator. For example, for a reference feature pattern locator of (x,y,z) in the first set of ultrasound data, the feature pattern processor 105 selects a corresponding search region marker of (x',y',z') in the second set of ultrasound data values. In a preferred embodiment, the search region marker (x',y',z') and the feature pattern locator (x,y,z) represent the same position in the respective set of ultrasound data values.

The search region is determined to be a group of positions in the second set of ultrasound data associated with the search region marker (x',y',z'). In a preferred embodiment using three dimensional ultrasound data values, the search region includes a group of 40×40×40 positions in which the feature pattern processor 105 locates candidate feature patterns. The located candidate feature patterns are examined by the feature pattern correlator 115 for similarity to the reference feature pattern.

The feature pattern correlator 115 accesses the feature pattern matchers for the reference feature pattern and the candidate feature patterns stored in the memory 110. The feature pattern correlator 115 generates a correlation factor that indicates the similarity between the reference feature pattern and the located candidate feature patterns. In one embodiment, the feature pattern processor 115 generates the correlation factors by determining the normalized correlation coefficients between the reference feature pattern matcher and the candidate feature pattern matchers as disclosed in *Statistics for Engineering and the Sciences* by William Mendenhall and Terry Sincich, published by Prentice Hall in 1995.

The feature pattern correlator 115 transmits the correlation factors to a candidate feature pattern selector 120. The candidate feature pattern selector 120 selects the candidate feature pattern having the best correlation with the reference feature pattern and compares the selected correlation factor to a predetermined threshold value that indicates an acceptable level of correlation between the reference feature pattern and the selected candidate feature pattern. The candidate feature pattern selector 120 transmits the selected candidate feature pattern to the reference feature pattern movement indicator 121. In an embodiment where the normalized correlation coefficients are used, the predetermined threshold value may be about 0.8.

If the correlation of the selected candidate feature pattern is less than the predetermined threshold value, no match was found for the reference feature pattern among the candidate feature patterns and the reference feature pattern is discarded. In another embodiment, the unmatched reference feature pattern is tagged with a corresponding indicator and transmitted to the ultrasound scanner 103. For example, the unmatched reference feature pattern may be designated with a particular color for display by the ultrasound scanner 103.

The reference feature pattern movement indicator 121 determines the movement of the reference feature pattern based on the reference feature pattern locator and the selected candidate feature pattern locator. The difference in the two locators is used to provide a motion vector corresponding to the movement of the reference feature pattern in the time from $t_1$ to $t_2$. The velocity of the reference feature pattern over the interval from $t_1$ to $t_2$ can be determined by the reference feature pattern movement indicator 121 by dividing the motion vector component with time interval from $t_1$ to $t_2$.

The reference feature pattern movement indicator 121 transmits the determined movement and velocity of the reference feature pattern to the ultrasound scanner 103. The ultrasound scanner 103 then displays the movement and velocity of the biological tissue on the display 125. In one embodiment, the ultrasound scanner 103 includes dedicated hardware and/or software that determines the velocity of the reference feature pattern based on the determined movement transmitted from the reference feature pattern movement indicator 121. In another embodiment, the velocity of the reference feature pattern is determined by an external unit that transmits the velocity to the ultrasound scanner 103 or the display 125.

Figure 3:
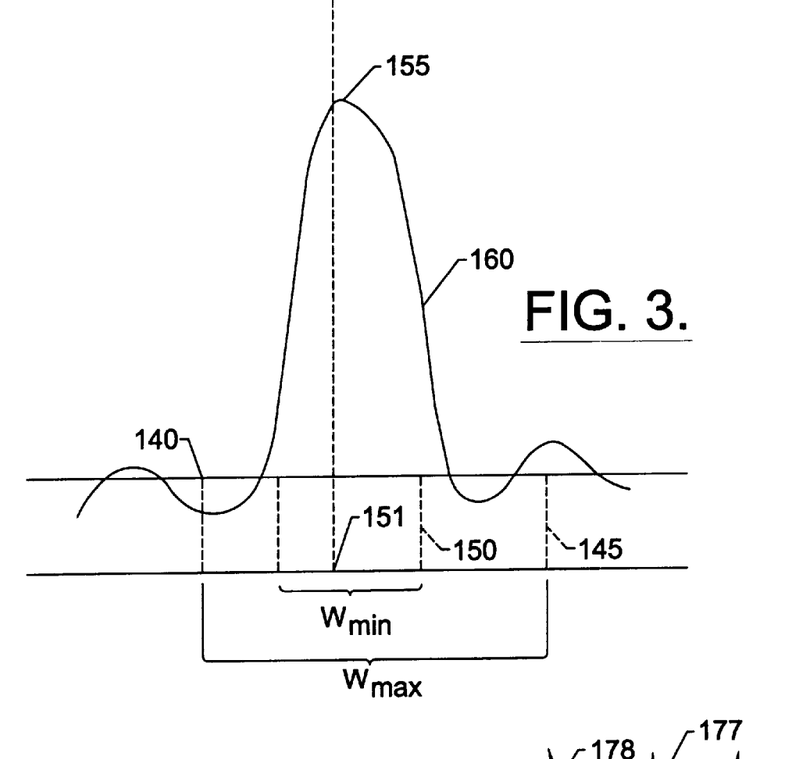
FIG. 3 is a graphical illustration of a one dimensional feature pattern according to the present invention.

The feature pattern processor 105 will now be described in further detail. FIG. 3 is a graphical illustration of a one dimensional feature pattern according to the present invention. The feature pattern processor 105 locates the reference and candidate feature patterns in the first and second sets of ultrasound data values. In particular, the feature pattern processor 105 uses a threshold value 140 combined with a minimum window width 150 and a maximum window width 145 to identify a segment of ultrasound data values as a feature pattern. If the intensity of the ultrasound data values exceed the threshold value 140 over a region that exceeds the minimum window width 150 and does not exceed the maximum window width 145, the ultrasound data values are designated as a segment 160. The feature pattern processor 105 determines the local maximum 155 of the segment 160 between the maximum window width 145 and the minimum window width 150.

The feature pattern processor 105 compares all of the local maxima in a localized region to determine a global maximum for the localized region. If the local maximum 155 is greater than the other local maxima in the localized region, local maximum 155 is the global maximum for the localized region. The segment 160 is designated as a feature pattern and the point 151 is designated as the feature pattern locator for the feature pattern. In an alternate embodiment, the feature pattern locator is the centroid of the segment 160.

The threshold value 140 can be a constant or a variable value used to locate the segment which includes the local maximum. For example, a constant threshold value can be the global mean of the ultrasound data values included in a particular scan line. Ultrasound data values in the scan line that exceed the constant threshold value (for more than the minimum window width and less than the maximum window width) are designated as a segment. The local maximum is determined for the designated segment and compared to the other local maxima in the localized region to determine the global maximum for the localized region.

Alternately, the threshold value can be variable. In a preferred embodiment, a variable threshold value is generated by applying a low-pass filter, such as an n-point moving average operation, to the ultrasound data values in a scan line. For example, the variable threshold value can be determined using an 11 point moving average operation as disclosed in *Adaptive Filter Theory* by Simon Haykin, published by Prentice Hall in 1996.

Ultrasound data values in the scan line that exceed the variable threshold value (for more than the minimum window width and less than the maximum window width) are designated as segments. The local maximum is determined for the designated segment and compared to the other local maxima in the localized region to determine the global maximum in the localized region.

Figure 4:
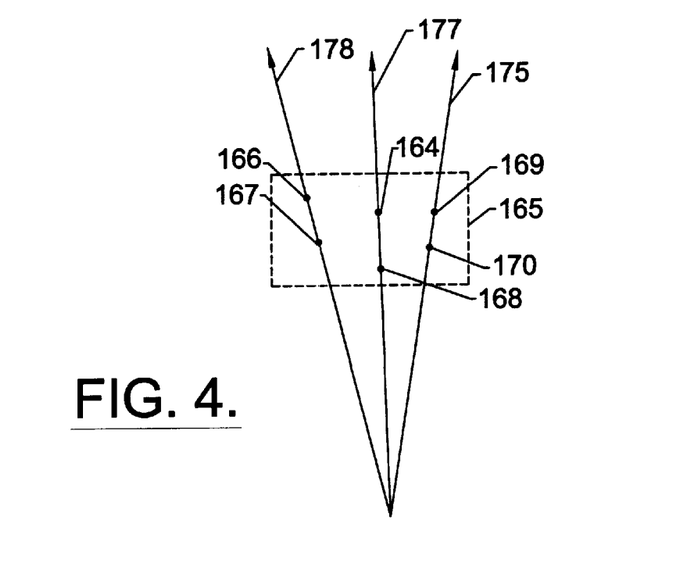
FIG. 4 illustrates a two dimensional (2D) ultrasound scan with scan lines having local maxima in a localized area.

FIG. 4 illustrates a group of neighboring scan lines in a two dimensional (2D) ultrasound system. The feature pattern processor 105 applies the 1D techniques described above to the portions of the scan lines in the localized region 165 to determine the local maximum for each scan line in the localized region 165. The local maximum with the highest value in the localized area 165 is the global maximum for the localized region 165. If, for example, the local maximum 164 is greater than the local maxima 166, 167, 168, 169 and 170, the local maximum 164 is the global maximum and the point that corresponds to the local maximum 164 is designated as the feature pattern locator for the feature pattern.

Figure 5:
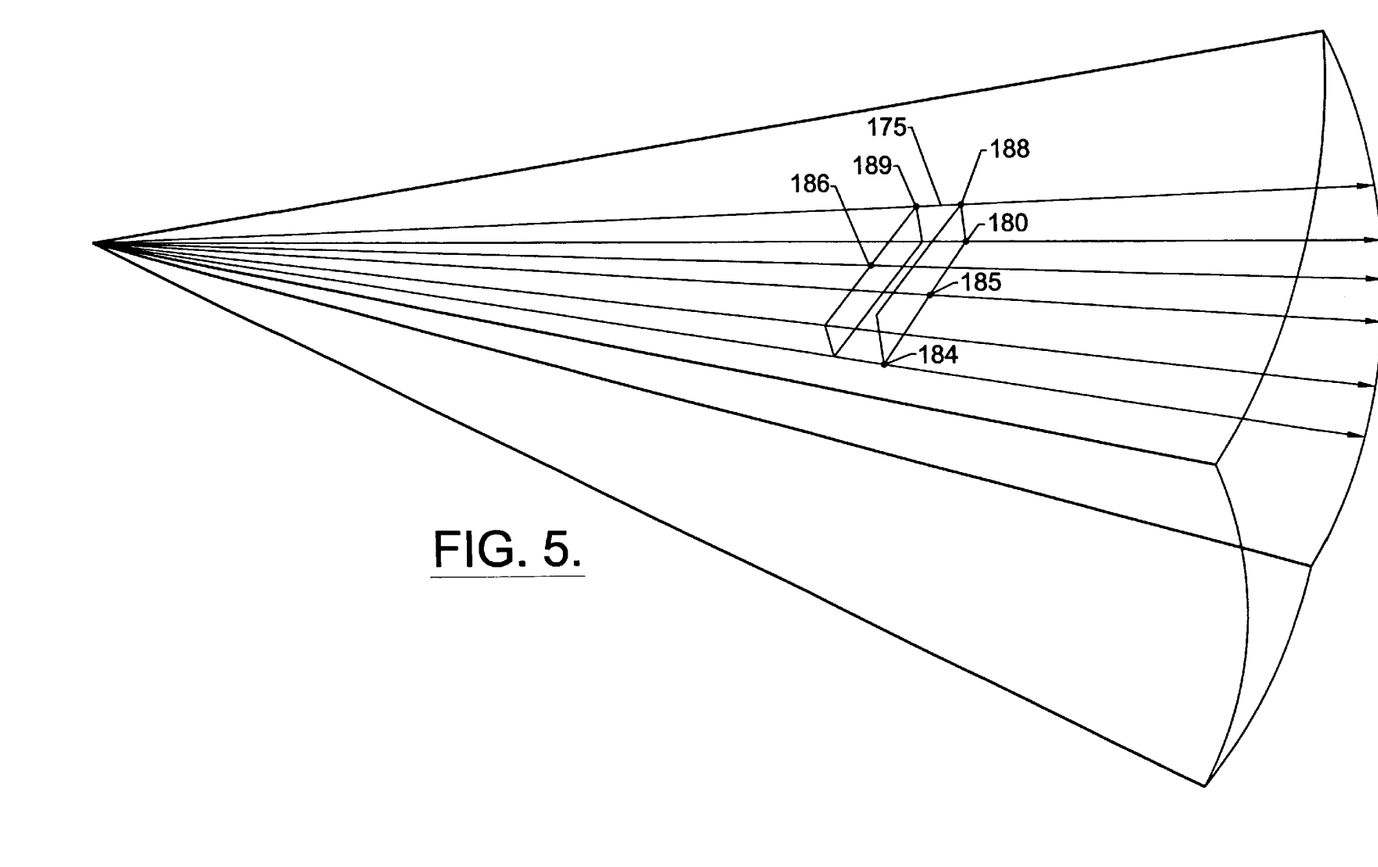
FIG. 5 illustrates a three dimensional (3D) ultrasound scan with scan lines having local maxima in a localized volume.

FIG. 5 illustrates a group of neighboring ultrasound scan lines in a three dimensional (3D) ultrasound system. The feature pattern processor 105 applies the 1D techniques described above to the portions of the scan lines in the localized volume 175 to determine the local maxima 180, 184, 185, 186, 188, and 189 for the scan lines in the localized volume 175. The local maximum with the greatest value is the global maximum for the localized volume 175. If, for example, local maximum 180 is greater than local maxima 184, 185, 186, 188, and 189, local maximum 180 is the global maximum for the localized volume 175 and the point that corresponds to the local maximum 180 is designated as the feature pattern locator for the feature pattern.

Figure 6:
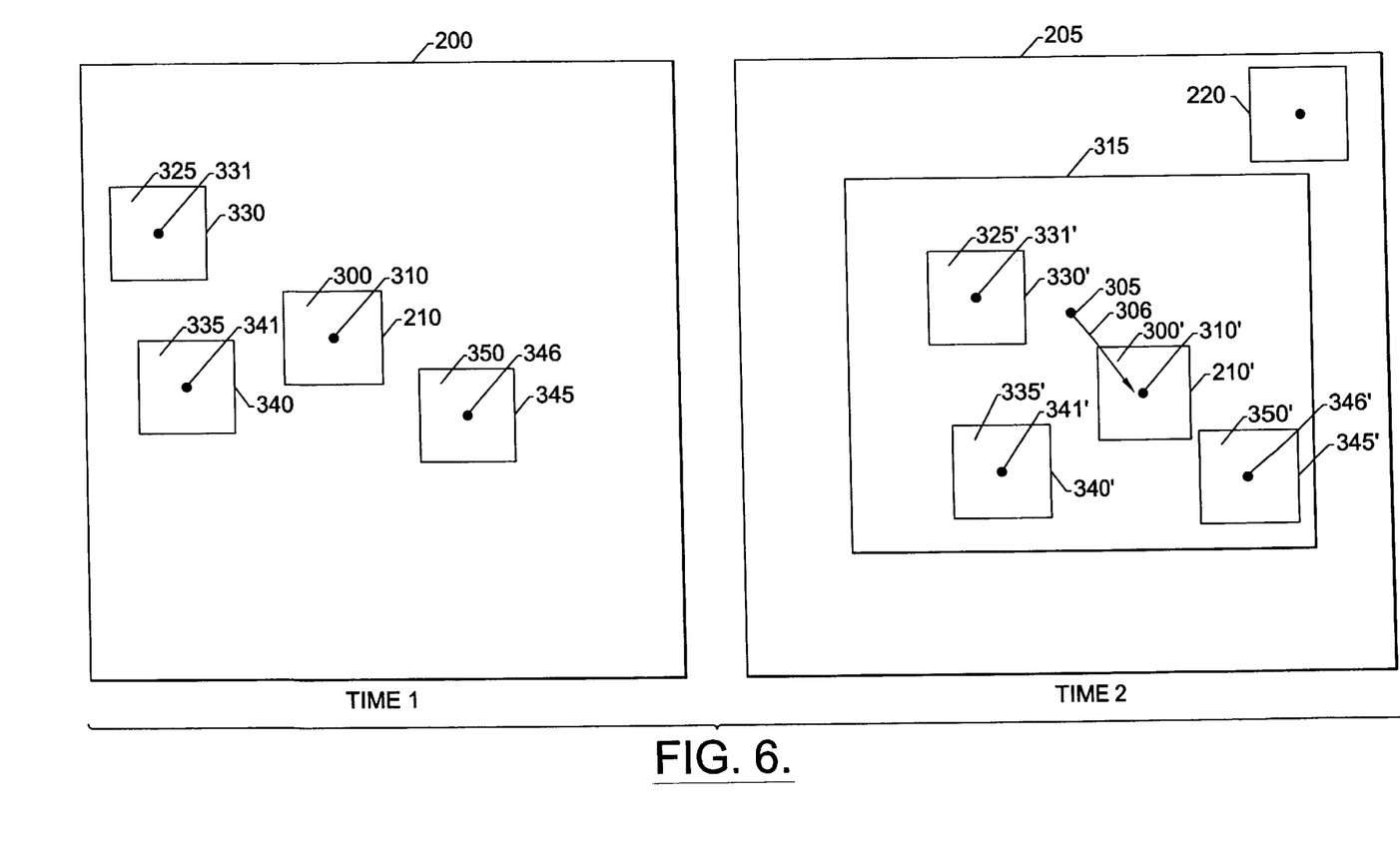
FIG. 6 is an illustration of two successive ultrasound scans of biological tissue movement according to the present invention.

FIG. 6 illustrates two successive ultrasound scans of biological tissue according to the present invention. Scan 200 shows feature patterns 210, 330, 340, and 345 at time $t_1$. Scan 205 shows feature patterns 210', 330', 340', and 345' at new positions at time $t_2$, having moved to new positions in the time interval between $t_1$ and $t_2$. Scan 205 also shows a feature pattern 220 outside the search region 315.

In the scan 200, the reference feature pattern 210 is located as described above. The reference feature pattern 210 includes a feature pattern locator 310 that indicates the position of the reference feature pattern in the first set of ultrasound data values and a feature pattern matcher 300. The feature pattern matcher 300 is a uniqueness identifier that includes ultrasound data values at positions associated with the feature pattern locator 310. For example, in the case of three dimensional data, the feature pattern matcher 300 can be a 10×10×10 kernel that includes ultrasound data values from the first scan surrounding the reference feature pattern 210.

The search region marker 305 corresponds to the position of the reference feature pattern locator 310 in the first set of ultrasound data in the second set of ultrasound data values. The search region 315 includes positions in the second set of ultrasound data values associated with the search region marker 305. For example, in a 3D system the search region 315 may be a 40×40×40 volume surrounding the search region marker 305, wherein the search region marker 305 is at the center of the search region 315.

The search for feature patterns to be identified as candidate feature patterns is conducted in the search region 315. The feature patterns 210', 330', 340', and 345' are detected in the search region 315. Accordingly, feature patterns 210', 330', 340', and 345' are designated as candidates feature patterns. The feature pattern 220 is not designated as a candidate feature pattern because it is located outside the search region. The present invention determines a correlation factor for the feature patterns located in the search region, thereby allowing a reduction in the computational time. The candidate feature patterns 210', 330', 340', and 345' can be detected using the same technique used to detect the reference feature pattern 210 described above.

The correlation is determined by generating a correlation factor that indicates the similarity between the reference feature pattern 210 and the candidate feature patterns 210', 330', 340', and 345'. In one embodiment, the correlation is provided by determining the normalized correlation coefficients between the reference feature pattern matcher and candidate feature pattern matchers.

The candidate feature pattern having the highest correlation with the reference feature pattern 210 is selected as the new position of the reference feature pattern 210 in the scan 205. For example, if the candidate feature pattern 210' matches the reference feature pattern 210, the vector 306 indicates the movement of the reference feature pattern 210 during the time interval between $t_1$ and $t_2$. The components of the velocity are determined by dividing the vector 306 by the time interval between $t_1$ and $t_2$.

Figure 7:
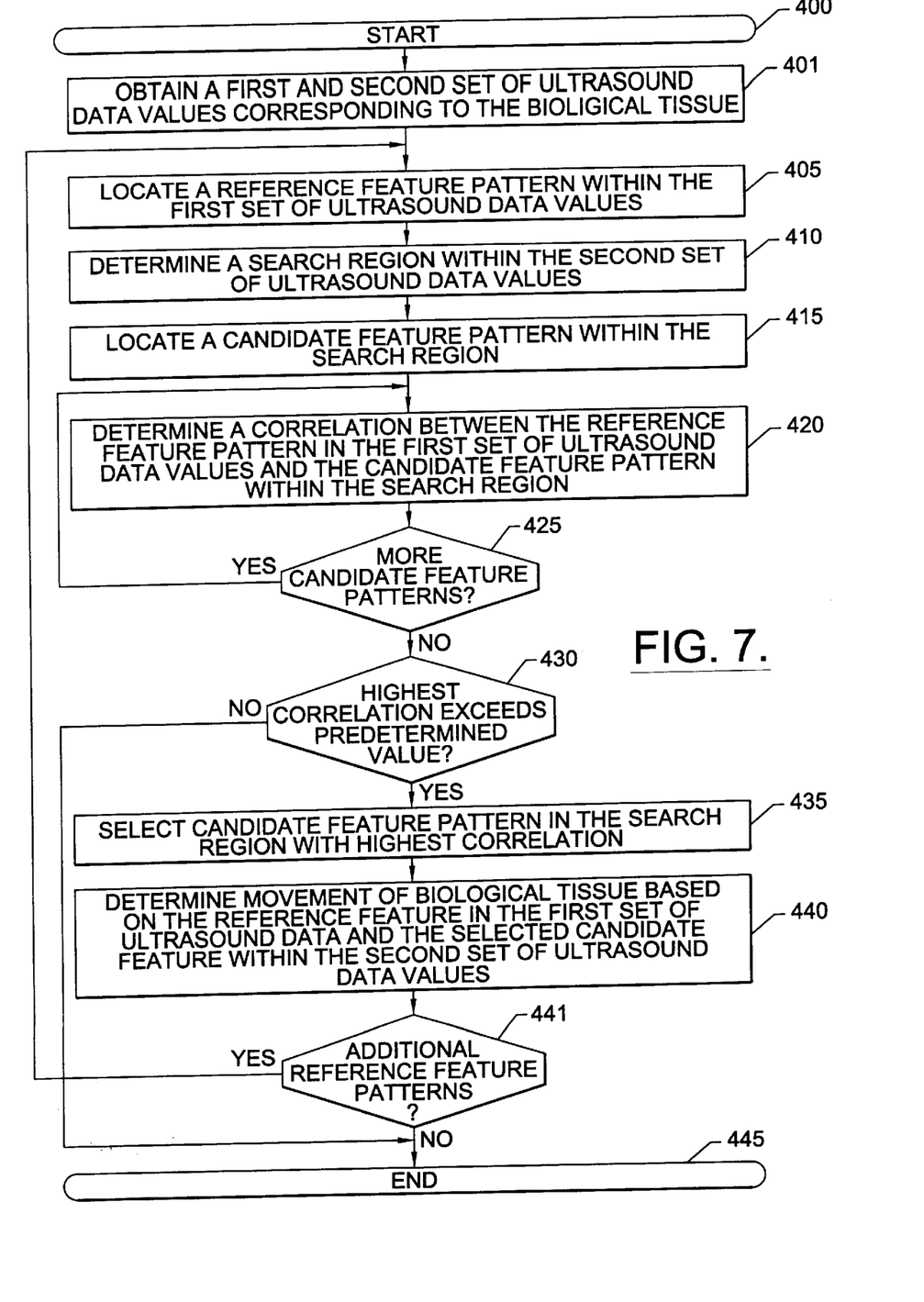
FIG. 7 is a flow chart of operations of an ultrasound system that measures biological tissue according to the present invention.

FIG. 7 is a flow chart of operations of an ultrasound system for measuring biological tissue according to the present invention. Operations begin at block 400. First and second sets of ultrasound data values are obtained (block 401). The first and second sets of ultrasound data values are obtained over a time interval. A feature pattern is located in the first set of ultrasound data which is established as the reference feature pattern (block 405). The reference feature pattern includes a reference feature pattern locator that indicates the position of the feature pattern in the first set of ultrasound data values and a reference feature pattern matcher that includes ultrasound data values associated with the reference feature pattern locator.

The search region is determined in the second set of ultrasound data values (block 410). The search region is determined by selecting a search region marker in the second set of ultrasound data values that corresponds to the reference feature pattern locator. The search region includes ultrasound data values in the second set of ultrasound data values that are associated with the search region marker. For example, in a 3D system, the search region may be a 40×40×40 volume that surrounds the search region marker.

The search region in the second set of ultrasound data is searched to locate feature patterns to provide candidate feature patterns in the second set of ultrasound data values (block 415). A feature pattern matcher is determined for each of the located candidate feature patterns. The candidate feature pattern matcher is a uniqueness identifier associated with the candidate feature pattern locator. A correlation is determined between the reference feature pattern in the first set of ultrasound data values and the located candidate feature patterns in the search region in the second set of ultrasound data values (block 420).

The correlation is determined by producing a correlation factor that indicates the similarity between the reference feature pattern and the candidate feature patterns. If more candidate feature patterns are located in the search region in the second set of ultrasound data values (block 425), a correlation is determined between the additional candidate feature patterns and the reference feature pattern (block 420) until all candidate feature patterns have been evaluated. Otherwise, processing continues at block 430.

If the candidate feature pattern with the highest correlation to the reference feature pattern does not exceed a predetermined value (block 430), processing ends (block 445). If the correlation factor exceeds the predetermined value, the candidate feature pattern with the highest correlation to the reference feature pattern is selected to represent the new position of the reference feature pattern in the second set of ultrasound data values (block 435). The movement of the biological tissue can then be determined based on the reference feature pattern locator and the selected candidate feature pattern locator (block 440). If additional candidate feature patterns are located in the first set of ultrasound data values (block 441), processing continues at block 405. If no other reference feature patterns are located in the first set of ultrasound data values, operations end at block 445.

While the present invention has been described with reference to three dimensional ultrasound applications, one and two dimensional applications are also within the scope of the present invention. For example, a one or two dimensional ultrasound system may estimate biological tissue movement using the methods, systems, and computer program products described herein.

In the drawings and specification, there have been disclosed typical preferred embodiments of the invention and, although specific terms are employed, they are used in a generic and descriptive sense only and not for purposes of limitation, the scope of the invention being set forth in the following claims.

What is claimed is:

1. A method of determining movement of biological tissue, using ultrasound data values, wherein the ultrasound data values represent an intensity of reflected ultrasound energy corresponding to a position of the biological tissue, the method comprising:

obtaining a first set of ultrasound data values corresponding to positions of the biological tissue at a first time;

obtaining a second set of ultrasound data values corresponding to positions of the biological tissue at a second time;

locating a feature pattern in the first set of ultrasound data values so as to provide a reference feature pattern;

determining a search region in the second set of ultrasound data values that corresponds to the located reference feature pattern in the first set of ultrasound data values;

locating a feature pattern in the search region of the second set of ultrasound data values so as to provide a candidate feature pattern corresponding to the reference feature pattern;

determining a correlation between the reference feature pattern in the first set of ultrasound data values and the candidate feature pattern in the search region in the second set of ultrasound data values; and selecting the candidate therefor feature pattern in the search region in the second set of ultrasound data values based on the correlation.

2. The method of claim 1, wherein the step of locating a reference feature pattern in the first set of ultrasound data values comprises:

determining a feature pattern locator that indicates a position of the reference feature pattern in the first set of ultrasound data values so as to provide a reference feature pattern locator; and determining a feature pattern matcher that includes ultrasound data values associated with the reference feature pattern locator so as to provide a reference feature pattern matcher.

3. The method of claim 2, wherein the step of determining a feature pattern locator comprises:

generating a threshold value based on an ultrasound scan line of ultrasound data values; and determining that a segment of ultrasound data values in the ultrasound scan line exceeds the threshold value.

4. The method of claim 3, wherein the step of generating a threshold value comprises applying a low-pass filter to the ultrasound data values in the ultrasound scan line.

5. The method of claim 2, wherein the step of determining a feature pattern matcher comprises selecting a group of ultrasound data values from a region in the first set of ultrasound data values associated with the reference feature pattern locator.

6. The method of claim 2, wherein the step of determining a feature pattern matcher comprises selecting a group of ultrasound data values from a region in the first set of ultrasound data values associated with the reference feature pattern locator so as to provide the reference feature pattern matcher.

7. A method of determining movement of biological tissue, using ultrasound data values, wherein the ultrasound data values represent an intensity of reflected ultrasound energy corresponding to a position of the biological tissue, the method comprising:

obtaining a first set of ultrasound data values corresponding to positions of the biological tissue at a first time;

obtaining a second set of ultrasound data values corresponding to positions of the biological tissue at a second time;

locating a feature pattern in the first set of ultrasound data values so as to provide a reference feature pattern;

determining a feature pattern locator that indicates a position of the reference feature pattern in the first set of ultrasound data values so as to provide a reference feature pattern locator;

selecting a search region marker in the second set of ultrasound data values that corresponds to the position of the reference feature pattern in the first set of ultrasound data values;

selecting positions in the second set of ultrasound data values associated with the search region marker that represent the search region;

locating a feature pattern in the search region of the second set of ultrasound data values so as to provide a candidate feature pattern corresponding to the reference feature pattern;

determining a correlation between the reference feature pattern in the first set of ultrasound data values and the candidate feature pattern in the search region in the second set of ultrasound data values; and selecting the candidate feature pattern in the search region in the second set of ultrasound data values based on the correlation.

8. The method of claim 7 wherein the step of selecting positions comprises selecting positions surrounding the search region marker in the second set of ultrasound data values.

9. A method of determining movement of biological tissue, using ultrasound data values, wherein the ultrasound data values represent an intensity of reflected ultrasound energy corresponding to a position of the biological tissue, the method comprising:

obtaining a first set of ultrasound data values corresponding to positions of the biological tissue at a first time;

obtaining a second set of ultrasound data values corresponding to positions of the biological tissue at a second time;

locating a feature pattern in the first set of ultrasound data values so as to provide a reference feature pattern;

determining a search region in the second set of ultrasound data values that corresponds to the located reference feature pattern in the first set of ultrasound data values;

determining a feature pattern locator that indicates a position of the candidate feature pattern in the search region in the second set of ultrasound data values so as to provide a candidate feature pattern locator;

determining a feature pattern matcher that includes ultrasound data values associated with the feature pattern locator so as to provide a candidate feature pattern matcher;

determining a correlation between the reference feature pattern in the first set of ultrasound data values and the candidate feature pattern in the search region in the second set of ultrasound data values; and selecting the candidate feature pattern in the search region in the second set of ultrasound data values based on the correlation.

10. The method of claim 8, wherein a reference feature pattern locator indicates a position of the reference feature pattern in the first set of ultrasound data values, and wherein a reference feature pattern matcher includes ultrasound data values associated with the reference feature pattern locator; and wherein the step of determining a correlation comprises generating a correlation factor that indicates the similarity between the reference feature pattern and the candidate feature pattern.

11. The method of claim 10, wherein the step generating a correlation factor comprises determining a normalized correlation coefficient between the reference feature pattern matcher and the candidate feature pattern matcher.

12. The method of claim 1, wherein a reference feature pattern locator indicates a position of the reference feature pattern in the first set of ultrasound data values, and wherein a candidate feature pattern locator indicates a position of a selected candidate feature pattern in the search region in the second set of ultrasound data; and wherein the method further comprises determining a movement of the biological tissue based on the reference feature pattern locator and the candidate feature pattern locator of the selected candidate feature pattern.

13. The method of claim 1, further comprising determining a movement of the reference feature pattern by determining a motion vector from a position of the reference feature pattern in the first set of ultrasound data values to a position of the selected candidate feature pattern in the search region in the second set of ultrasound data.

14. A system that determines movement of biological tissue, using ultrasound data values, wherein the ultrasound data values represent an intensity of reflected ultrasound energy corresponding to a position of the biological tissue, the system comprising:

means for obtaining a first set of ultrasound data values corresponding to positions of the biological tissue at a first time;

means for obtaining a second set of ultrasound data values corresponding to positions of the biological tissue at a second time;

means for locating a feature pattern in the first set of ultrasound data values so as to provide a reference feature pattern;

means for determining a search region in the second set of ultrasound data values that corresponds to the located reference feature pattern in the first set of ultrasound data values;

means for locating a feature pattern in the search region of the second set of ultrasound data values so as to provide a candidate feature pattern corresponding to the reference feature pattern;

means for determining a correlation between the reference feature pattern in the first set of ultrasound data values and the candidate feature pattern in the search region in the second set of ultrasound data values; and means for selecting the therefor candidate feature pattern in the search region in the second set of ultrasound data values based on the correlation.

15. The system of claim 14, wherein the means for locating a reference feature pattern in the first set of ultrasound data values comprises:

means for determining a feature pattern locator that indicates a position of the reference feature pattern in the first set of ultrasound data values so as to provide a reference feature pattern locator; and means for determining a feature pattern matcher that includes ultrasound data values associated with the reference feature pattern locator so as to provide a reference feature pattern matcher.

16. The system of claim 15, wherein the means for determining a feature pattern matcher comprises means for selecting a group of ultrasound data values from a region in the first set of ultrasound data values associated with the reference feature pattern locator so as to provide the reference feature pattern matcher.

17. The system of claim 14, wherein the means for determining a feature pattern locator comprises:
- means for generating a threshold value based on an ultrasound scan line of ultrasound data values; and
- means for determining that a segment of ultrasound data values in the ultrasound scan line exceeds the threshold value.

18. The system of claim 17, wherein the means for generating a threshold value comprises means for applying a low-pass filter to the ultrasound data values in the ultrasound scan line.

19. The system of claim 17, wherein the means for determining a feature pattern matcher comprises means for selecting a group of ultrasound data values from a region in the first set of ultrasound data values associated with the reference feature pattern locator.

20. A system that determines movement of biological tissue, using ultrasound data values, wherein the ultrasound data values represent an intensity of reflected ultrasound energy corresponding to a position of the biological tissue, the system comprising:
- means for obtaining a first set of ultrasound data values corresponding to positions of the biological tissue at a first time;
- means for obtaining a second set of ultrasound data values corresponding to positions of the biological tissue at a second time;
- means for locating a feature pattern in the first set of ultrasound data values so as to provide a reference feature pattern;
- means for determining a feature pattern locator that indicates a position of the reference feature pattern in the first set of ultrasound data values so as to provide a reference feature pattern locator;
- means for selecting a search region marker in the second set of ultrasound data values that corresponds to the position of the reference feature pattern in the first set of ultrasound data values;
- means for selecting positions in the second set of ultrasound data values associated with the search region marker that represent the search region;
- means for locating a feature pattern in the search region of the second set of ultrasound data values so as to provide a candidate feature pattern corresponding to the reference feature pattern;
- means for determining a correlation between the reference feature pattern in the first set of ultrasound data values and the candidate feature pattern in the search region in the second set of ultrasound data values; and
- means for selecting the candidate feature pattern in the search region in the second set of ultrasound data values based on the correlation.

21. The system of claim 20, wherein the means for selecting positions comprises means for selecting positions surrounding the search region marker in the second set of ultrasound data values.

22. A system that determines movement of biological tissue, using ultrasound data values, wherein the ultrasound data values represent an intensity of reflected ultrasound energy corresponding to a position of the biological tissue, the system comprising:
- means for obtaining a first set of ultrasound data values corresponding to positions of the biological tissue at a first time;
- means for obtaining a second set of ultrasound data values corresponding to positions of the biological tissue at a second time;
- means for locating a feature pattern in the first set of ultrasound data values so as to provide a reference feature pattern;
- means for determining a search region in the second set of ultrasound data values that corresponds to the located reference feature pattern in the first set of ultrasound data values;
- means for determining a feature pattern locator that indicates a position of the candidate feature pattern in the search region in the second set of ultrasound data values so as to provide a candidate feature pattern locator;
- means for determining a feature pattern matcher that includes ultrasound data values associated with the feature pattern locator so as to provide a candidate feature pattern matcher;
- means for locating a feature pattern in the search region of the second set of ultrasound data values so as to provide a candidate feature pattern corresponding to the reference feature pattern;
- means for determining a correlation between the reference feature pattern in the first set of ultrasound data values and the candidate feature pattern in the search region in the second set of ultrasound data values; and
- means for selecting the candidate feature pattern in the search region in the second set of ultrasound data values based on the correlation.

23. The system of claim 21, wherein a reference feature pattern locator indicates a position of the reference feature pattern in the first set of ultrasound data values, and wherein a reference feature pattern matcher includes ultrasound data values associated with the reference feature pattern locator; and wherein the means for determining a correlation comprises means for generating a correlation factor that indicates a similarity between the reference feature pattern and the candidate feature pattern.

24. The system of claim 23, wherein the means for generating a correlation factor comprises means for generating a normalized correlation coefficient between the reference feature pattern matcher and the candidate feature pattern matcher.

25. The system of claim 14, wherein a reference feature pattern locator indicates a position of the reference feature pattern in the first set of ultrasound data values, and wherein a candidate feature pattern locator indicates a position of a selected candidate feature pattern in the search region in the second set of ultrasound data; and wherein the system further comprises means for determining a movement of the biological tissue based on the reference feature pattern locator and the candidate feature pattern locator of the selected candidate feature pattern.

26. The system of claim 14, further comprising means for determining a movement of the reference feature pattern by determining a motion vector from a position of the reference feature pattern in the first set of ultrasound data values to a position of the selected candidate feature pattern in the search region in the second set of ultrasound data.

27. An ultrasound imaging apparatus that determines movement of biological tissue using a first and a second set of ultrasound data values, wherein the ultrasound data values represent an intensity of reflected ultrasound energy corresponding to a position of the biological tissue, the apparatus comprising:
- a feature pattern processor that locates a reference feature pattern in the first set of ultrasound data values, and that determines a search region in the second set of ultrasound data values that corresponds to the located reference feature pattern in the first set of ultrasound data values, and that locates a candidate feature pattern in the search region in the second set of ultrasound data values based on the reference feature pattern in the first set of ultrasound data values;

a feature pattern correlator, responsive to the feature pattern processor, that determines a correlation between the reference feature pattern in the first set of ultrasound data values and the located candidate feature pattern in search region in the second set of ultrasound data values; and a candidate feature pattern selector, responsive to the feature correlator, that selects the candidate therefor feature pattern from the located candidate feature patterns in the search region in the second set of ultrasound data having a correlation that exceeds a predetermined value.

28. The apparatus of claim 27, wherein the feature pattern processor determines a feature pattern locator that indicates a position of the reference feature pattern in the first set of ultrasound data values so as to provide a reference feature pattern locator; and determines a feature pattern matcher that includes ultrasound data values associated with the reference feature pattern locator so as to provide a reference feature pattern matcher.

29. The method of claim 28, wherein the feature pattern processor determines a feature pattern locator by generating a threshold value based on an ultrasound scan line of ultrasound data values; and by determining that a segment of ultrasound data values in the ultrasound scan line exceeds the threshold value.

30. The apparatus of claim 29, wherein the feature pattern processor generates a threshold value by applying a low-pass filter to the ultrasound data values in the ultrasound scan line.

31. The apparatus of claim 28, wherein the feature pattern processor determines a feature pattern matcher by selecting a group of ultrasound data values from a region in the first set of ultrasound data values associated with the reference feature pattern locator.

32. The apparatus of claim 28, wherein the feature pattern processor determines a search region in the second set of ultrasound data values by selecting a search region marker in the second set of ultrasound data values that corresponds to the reference feature pattern locator; and by selecting positions in the second set of ultrasound data values associated with the search region marker that represent the search region in the second set of ultrasound data values.

33. The apparatus of claim 32 wherein the feature pattern processor selects positions by selecting positions surrounding the search region marker in the second set of ultrasound data values.

34. The apparatus of claim 27, wherein the feature pattern processor determines a feature pattern locator that indicates a position of the candidate feature pattern in the search region in the second set of ultrasound data values so as to provide a candidate feature pattern locator; and determines a feature pattern matcher that includes ultrasound data values associated with the feature pattern locator so as to provide a candidate feature pattern matcher.

35. The apparatus of claim 34, wherein the feature pattern processor determines a feature pattern matcher by selecting a group of ultrasound data values from a region in the second set of ultrasound data values associated with the candidate feature pattern locator so as to provide the candidate feature pattern matcher.

36. The apparatus of claim 34, wherein a reference feature pattern locator indicates a position of the reference feature pattern in the first set of ultrasound data values, and wherein a reference feature pattern matcher includes ultrasound data values associated with the reference feature pattern locator; and wherein the feature pattern correlator determines a correlation by generating a correlation factor that indicates the similarity between the reference feature pattern and the candidate feature pattern.

37. The apparatus of claim 36, wherein the feature pattern correlator generates a correlation factor by generating a normalized correlation coefficient between the reference feature pattern matcher and the candidate feature pattern matcher.

38. The apparatus of claim 27, wherein a reference feature pattern locator indicates a position of the reference feature pattern in the first set of ultrasound data values, and wherein a candidate feature pattern locator indicates a position of a selected candidate feature pattern in the search region in the second set of ultrasound data; and wherein the apparatus further comprises a reference feature pattern movement indicator that determines a movement of the biological tissue based on the reference feature pattern locator and the candidate feature pattern locator of the selected candidate feature pattern.

39. A computer program product that determines movement of biological tissue, using ultrasound data values, wherein the ultrasound data values represent an intensity of reflected ultrasound energy corresponding to a position of the biological tissue, the computer program product comprising:

a computer-readable storage medium having computer-readable program code means embodied in said medium, said computer-readable program code means comprising:

computer readable program code means for obtaining a first set of ultrasound data values corresponding to positions of the biological tissue at a first time;

computer readable program code means for obtaining a second set of ultrasound data values corresponding to positions of the biological tissue at a second time;

computer readable program code means for locating a feature pattern in the first set of ultrasound data values so as to provide a reference feature pattern;

computer readable program code means for determining a search region in the second set of ultrasound data values that corresponds to the located reference feature pattern in the first set of ultrasound data values;

computer readable program code means for locating a feature pattern in the search region of the second set of ultrasound data values so as to provide a candidate feature pattern corresponding to the reference feature pattern;

computer readable program code means for determining a correlation between the reference feature pattern in the first set of ultrasound data values and the candidate feature pattern in the search region in the second set of ultrasound data values; and computer readable program code means for selecting the candidate therefor feature pattern in the search region in the second set of ultrasound data values based on the correlation.

40. The computer program product of claim 39, wherein the computer readable program code means for locating a reference feature pattern in the first set of ultrasound data values comprises:

computer readable program code means for determining a feature pattern locator that indicates a position of the reference feature pattern in the first set of ultrasound data values so as to provide a reference feature pattern locator; and computer readable program code means for determining a feature pattern matcher that includes ultrasound data values associated with the reference feature pattern locator so as to provide a reference feature pattern matcher.

41. The computer program product of claim 40, wherein the computer readable program code means for determining a feature pattern locator comprises:

computer readable program code means for generating a threshold value based on an ultrasound scan line of ultrasound data values; and computer readable program code means for determining that a segment of ultrasound data values in the ultrasound scan line exceeds the threshold value.

42. The computer program product of claim 41, wherein the computer readable program code means for generating a threshold value comprises computer readable program code means for applying a low-pass filter to the ultrasound data values in the ultrasound scan line.

43. The computer program product of claim 42, wherein the computer readable program code means for determining a feature pattern matcher comprises means for selecting a group of ultrasound data values from a region in the first set of ultrasound data values associated with the reference feature pattern locator so as to provide the reference feature pattern matcher.

44. The computer program product of claim 39, wherein the computer readable program code means for determining a search region in the second set of ultrasound data values comprises:

computer readable program code means for determining a feature pattern locator that indicates a position of the reference feature pattern in the first set of ultrasound data values so as to provide a reference feature pattern locator;

computer readable program code means for selecting a search region marker in the second set of ultrasound data values that corresponds to the position of the reference feature pattern in the first set of ultrasound data values; and computer readable program code means for selecting positions in the second set of ultrasound data values associated with the search region marker that represent the search region.

45. The computer program product of claim 44, wherein the computer readable program code means for selecting positions comprises means for selecting positions surrounding the search region marker in the second set of ultrasound data values.

46. The computer program product of claim 39, wherein the computer readable program code means for locating a candidate feature pattern in the search region comprises:

computer readable program code means for determining a feature pattern locator that indicates a position of the candidate feature pattern in the search region in the second set of ultrasound data values so as to provide a candidate feature pattern locator; and computer readable program code means for determining a feature pattern matcher that includes ultrasound data values associated with the feature pattern locator so as to provide a candidate feature pattern matcher.

47. The computer program product of claim 46, wherein the computer readable program code means for determining a feature pattern matcher comprises means for selecting a group of ultrasound data values from a region in the first set of ultrasound data values associated with the reference feature pattern locator.

48. The computer program product of claim 46, wherein a reference feature pattern locator indicates a position of the reference feature pattern in the first set of ultrasound data values, and wherein a reference feature pattern matcher includes ultrasound data values associated with the reference feature pattern locator; and wherein the computer readable program code means for determining a correlation comprises computer readable program code means for generating a correlation factor that indicates a similarity between the reference feature pattern and the candidate feature pattern.

49. The computer program product of claim 48, wherein the computer readable program code means for generating a correlation factor comprises means for generating a normalized correlation coefficient between the reference feature pattern matcher and the candidate feature pattern matcher.

50. The computer program product of claim 39, wherein a reference feature pattern locator indicates a position of the reference feature pattern in the first set of ultrasound data values, and wherein a candidate feature pattern locator indicates a position of a selected candidate feature pattern in the search region in the second set of ultrasound data; and wherein the computer program product further comprises computer readable program code means for determining a movement of the biological tissue based on the reference feature pattern locator and the candidate feature pattern locator of the selected candidate feature pattern.

51. The computer program product of claim 39, further comprising computer readable program code means for determining a movement of the reference feature pattern by determining a motion vector from a position of the reference feature pattern in the first set of ultrasound data values to a position of the selected candidate feature pattern in the search region in the second set of ultrasound data.

* * * * *

UNITED STATES PATENT AND TRADEMARK OFFICE
CERTIFICATE OF CORRECTION

PATENT NO.     :     6,066,095
DATED          :     May 23, 2000
INVENTOR(S)    :     Ahmed A. Morsy, Olaf T. von Ramm It is certified that errors appear in the above-identified patent and that said Letters Patent is hereby corrected as shown below:

Column 12, Line 21, please delete -- therefor--

Column 14, Line 48, please delete -- therefor--

Column 16, Line 29, please delete "21" and substitute with -- 22--

Column 17, Line 14, please delete -- therefore --

Column 18, Line 61, please delete -- therefore --

Signed and Sealed this

First Day of May, 2001

Attest:

NICHOLAS P. GODICI

Attesting Officer

Acting Director of the United States Patent and Trademark Office